US008485417B1

(12) United States Patent
Chang et al.

(10) Patent No.: US 8,485,417 B1
(45) Date of Patent: *Jul. 16, 2013

(54) PLANAR RF ELECTROMECHANICAL SWITCH

(75) Inventors: David T. Chang, Calabasas, CA (US); Tsung-Yuan Hsu, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,082

(22) Filed: May 11, 2012

Related U.S. Application Data

(62) Division of application No. 12/352,914, filed on Jan. 13, 2009, now Pat. No. 8,242,865.

(51) Int. Cl.
*B23K 31/00* (2006.01)
*B23K 31/02* (2006.01)

(52) U.S. Cl.
USPC .................. 228/122.1; 228/123.1; 228/124.1; 228/124.5; 228/178; 228/179.1; 305/78; 200/181

(58) Field of Classification Search
USPC ............. 228/122.1, 123.1, 124.1, 124.5, 178, 228/179.1; 335/78; 200/181
See application file for complete search history.

(56) References Cited

U.S. PATENT DOCUMENTS

| | | | | |
|---|---|---|---|---|
| 6,310,339 | B1 | 10/2001 | Hsu et al. | 250/214.1 |
| 6,803,559 | B2 | 10/2004 | Hsu et al. | 250/227.22 |
| 7,352,266 | B2 | 4/2008 | Chou | 335/78 |
| 8,246,846 | B1 * | 8/2012 | Chang et al. | 216/80 |
| 2003/0058069 | A1 | 3/2003 | Schwartz et al. | 335/78 |
| 2004/0207498 | A1 | 10/2004 | Hyman et al. | 335/78 |

OTHER PUBLICATIONS

Huang, X.M.H., et al., "Free-Free Beam Silicon Nanomechanical Resonators," IEEE, The 12th International Conference on Solid State Sensors, Actuators and Microsystems (Jun. 8-12, 2003).

Seki, T., et al., "Low-Loss RF MEMS Metal-to-metal Contact Switch with CSP Structure," IEEE, The 12th International Conference on Solid State Sensors, Actuators and Microsystems (Jun. 8-12, 2003).

* cited by examiner

*Primary Examiner* — Keith Walker
*Assistant Examiner* — Erin Saad
(74) *Attorney, Agent, or Firm* — Ladas & Parry

(57) ABSTRACT

A micromachined switch is provided including a base substrate, a bond pad on the base substrate, a cantilever arm connected to the bond pad, the cantilever arm having a conductive via from the bond pad, a first actuation electrode on the base substrate, and a second actuation electrode on the cantilever arm connected to the bond pad by way of the conductive via, positioned such that an actuation voltage applied between the first actuation electrode and the second actuation electrode will deform the cantilever arm, wherein the first actuation electrode is facing a side of the cantilever arm opposite the second actuation electrode.

14 Claims, 8 Drawing Sheets

(Front View of Fig 1A)

PLANAR RF ELECTROMECHANICAL SWITCH

CROSS REFERENCE TO RELATED APPLICATION

This is a divisional application of U.S. patent application Ser. No. 12/352,914, filed on Jan. 13, 2009, which is incorporated herein as though set forth in full.

TECHNICAL FIELD

This disclosure relates to radio frequency (RF) electromechanical device technology and, more particularly, to an improved planar micromachined quartz electromagnetic switch, which provides increased reliability, yield and performance.

BACKGROUND

Electromechanical devices generally comprise a class of devices that combine electrical and mechanical parts. There are many types of electromechanical devices, and examples include microelectromechanical (MEM) devices, microelectromechanical systems (MEMS), microsystems (MST), nanoelectromechanical systems (NEMS), sensors, transducers, actuators and switches. Electromechanical devices having planar configurations offer several advantages over non-planar configurations, including reduced size, lower power consumption, and lower fabrication costs.

The two most widely used techniques for fabricating planar electromechanical devices are surface micromachining (SM) and bulk micromachining (BM). While SM defines a structure by deposition and etching of different structural layers, BM defines a structure by selectively etching inside a substrate. The differences in these two manufacturing processes results in differences in structures and properties of devices fabricated thereby. For example, due to the conformal nature of SM, which involves successive depositions of metals and dielectrics, nonplanar structures also known as step beams are formed. Switches embodying these step beams are susceptible to latching or friction when a switch's cantilever conforms to its underlying electrical contact. In contrast, BM, which can include wafer bonding, yields planar structures.

Further, BM uses single crystal materials, which are superior to the deposited films used in SM. For example, single crystal substrates tend to have fewer crystal lattice defects than thin films. In addition, the mechanical properties of single crystal substrates (e.g., Young's modulus and Poisson's ratio) are highly repeatable, which again facilitates fewer crystal lattice defects. In contrast, the mechanical properties of thin films vary widely with the conditions under which such films are processed. Furthermore, while single crystal substrates are substantially free of built-in stresses, deposited thin films may include a variety of built-in compressive and tensile stresses that detrimentally affect manufacturing and performance. Due to these shortcomings, surface micromachined switches may develop stress concentration points during switch actuation which, over time, can lead to device failure. Similarly, contact dimples formed on switches using SM technology are prone to failure due to delaminations occurring between the thin film layers during extended periods of switch actuation.

In BM processing technology, the most popular substrate is silicon wafers due to the favorable anisotropic properties of silicon in which its crystal structure is arranged in lines and planes. Because of this structural arrangement, etching can be selectively performed on specific lines and planes that have relatively weak bonds. However, given the inferior insulation properties of silicon vis-a.-vis other materials, RF planar switches comprising silicon exhibit relatively low isolation and thus high insertion losses.

RF switches are widely used in a variety of applications including, for example, telecommunication applications. In this regard, RF switches are extremely important building blocks for reconfigurable RF communication systems. In one application, the use of planar RF switches can reduce the overall size, weight and cost of switch matrices on satellites. In other applications, planar RF switches can be incorporated into software programmable radio systems, reconfigurable antennas for radar, and antennas for mobile communications.

As can be seen, there exists a need in the art for improved methods and apparatus for planar RF switch technology offering a durable switch made from a single crystal in which the switch has high isolation, low insertion losses and highly repeatable mechanical properties. The embodiments of the present disclosure answer these and other needs.

SUMMARY

In a first embodiment disclosed herein, a process for fabricating a micro electromechanical switch comprises providing a base substrate, metalizing the base substrate to create a first bond pad, a first actuation electrode, a first circuit contact, and a second circuit contact, etching a cavity in a handle substrate, metalizing a lever substrate having a first side and a second side on the first side to create a second actuation electrode on the first side, attaching the handle substrate to the lever substrate so that the lever substrate is within the cavity in the handle substrate, metalizing the lever substrate on the second side opposite the first side to create a second bond pad and a switch contact on the second side of the lever substrate, wherein the second bond pad is connected to the second actuation electrode, bonding the first bond pad to the second bond pad, and etching the handle substrate to remove it from the lever substrate.

In another embodiment disclosed herein, a micromachined switch comprises a base substrate, a bond pad on the base substrate, a cantilever arm connected to the bond pad, the cantilever arm having a conductive via from the bond pad, a first actuation electrode on the base substrate, and a second actuation electrode on the cantilever arm connected to the bond pad by way of the conductive via, positioned such that an actuation voltage applied between the first actuation electrode and the second actuation electrode will deform the cantilever arm, wherein the first actuation electrode is facing a side of the cantilever arm opposite the second actuation electrode.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 2A through 13A are cross sectional views illustrating the steps of fabricating a planar RF electromechanical switch in accordance with the present disclosure.

FIGS. 2B through 13B correspond to FIGS. 2A-13A but illustrate top views of the steps of fabricating a planar RF electromechanical switch in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1A:
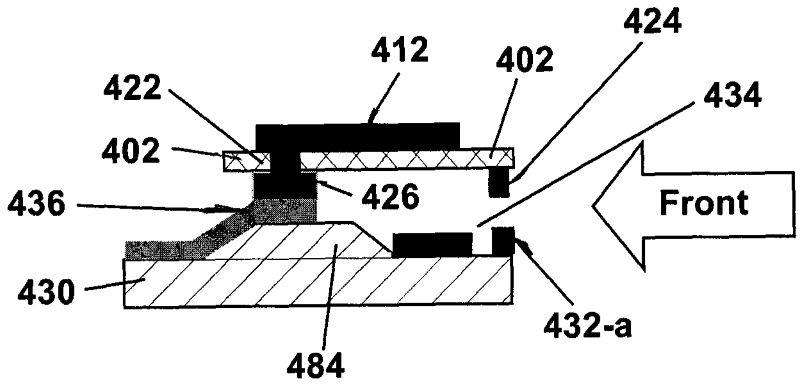
FIG. 1A is a cross sectional view of a planar RF electromechanical switch in accordance with the present disclosure.
Figure 1B:
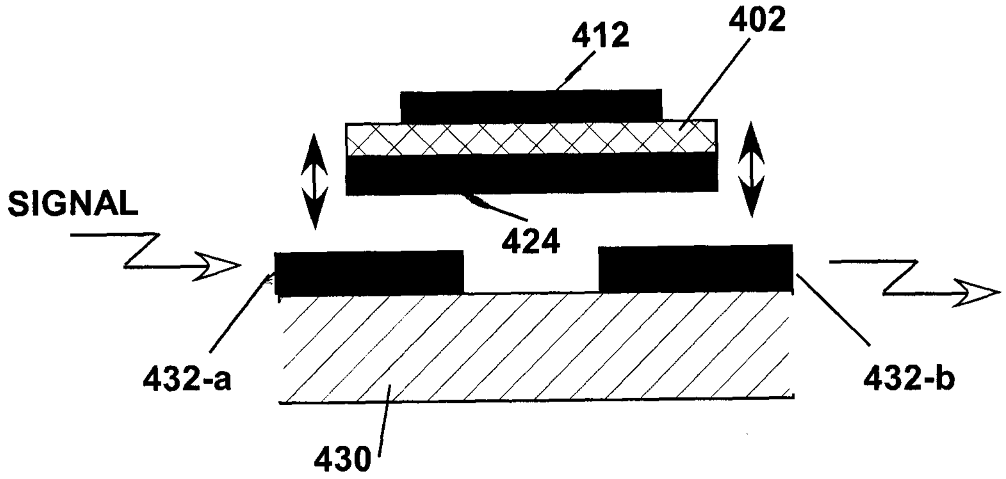
FIG. 1B is the front view of the electromechanical switch depicted in FIG. 1A in accordance with the present disclosure.

Referring now to the figures, FIG. 1A is a cross sectional view of a planar RF electromechanical MEMS switch of the present disclosure, which offers improved reliability, yield and performance. As is discussed below, quartz is used in the switch and provides −40 db isolation and −0.1 insertion loss due to its high dielectric qualities. FIG. 1B depicts the same switch from a "front" view FRONT. Illustrated is a host substrate 430 having an etched protrusion 484. Further illustrated are one portion of the RF line 432-*a*, a bottom actuation electrode 434, and a bottom bond pad 436, which have been patterned and metallized on the host substrate 430. Also illustrated are a quartz substrate 402 (that can be a single crystal substrate or a fused quartz substrate, which in one exemplary embodiment of the present disclosure may be patterned, etched, and thinned to a thickness of, for example, less than 10 micrometers) and a top actuation electrode 412 that has been patterned and metallized on the quartz substrate 402 with a via 422 that may be etched and metallized through the quartz substrate 402. Also illustrated are an RF contact 424 and a top bond pad 426, in which these structures have been patterned and metallized onto the quartz substrate 402. As illustrated, the top bond pad 426 may be bonded to the bottom bond pad 436, for example, by wafer bonding. In one embodiment of the present disclosure, the bottom bond pad 436 comprises a single layer metal. As shown in FIG. 1B, the actuation of the switch (voltage applied between the top actuation electrode 412 and the bottom actuation electrode 434) causes a piezoelectric response in the quartz substrate 402 which flexes towards DOWN the two portions of the RF line 432-*a*, 432-*b*. This in turn causes the RF contact 424 to make contact with the two ends of the RF line 432-*a*, 432-*b*, thereby closing the circuit and allowing a signal SIGNAL to pass between one portion of the RF line 432-*a* and the other portion of the RF line 432-*b*. The removal of the actuation voltage between the top actuation electrode 412 and the bottom actuation electrode 434 (not visible in FIG. 1B) ends the piezoelectric effect, allowing the quartz substrate 402 to return UP to a position where the RF contact is no longer providing an electrical path between both portions of the RF line 432-*a*, 432-*b*, breaking the circuit for the signal SIGNAL.

Figure 2A:
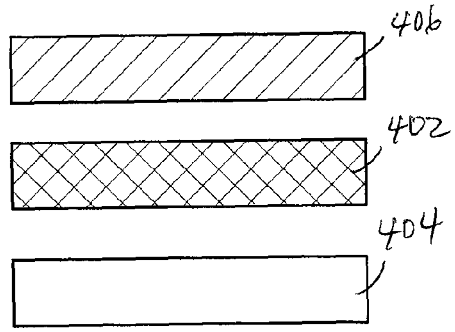
Figure 2B:
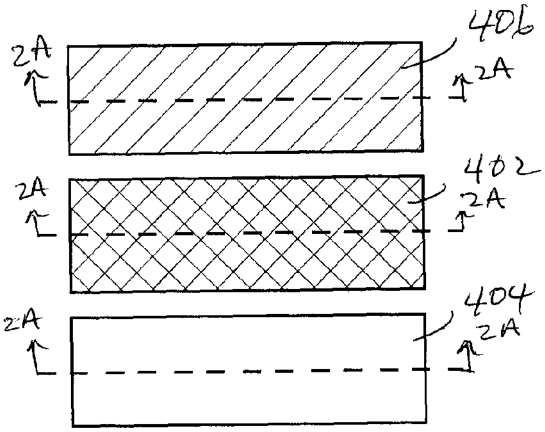

FIGS. 2A and 2B are, respectively, cross sectional views and top views of a step in the fabrication of a planar RF electromechanical switch of the present disclosure. FIGS. 2A and 2B illustrate a host substrate 406, a quartz substrate 402 and a handle substrate 404 that in a exemplary embodiment may be a silicon substrate having a thickness, for example, of 500 micrometers. Other embodiments of the handle substrate 404 include, but are not limited to, a group III, group IV or group V substrate. The quartz substrate 402 can be a single crystal substrate or a fused quartz substrate and in an exemplary embodiment of the present disclosure may be approximately 300 micrometers thick.

Figure 3A:
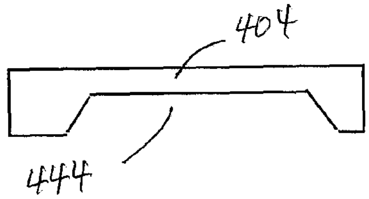
Figure 3B:
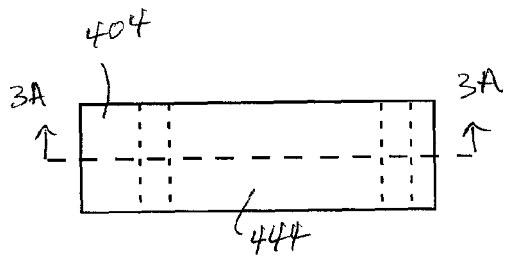

FIGS. 3A and 3B are, respectively, a cross sectional view and a top view of a step in the fabrication of a planar RF electromechanical switch of the present disclosure. These figures illustrate a handle substrate 404 that in an exemplary embodiment may be a silicon substrate that has been patterned and etched into a handle having a cavity 444 that can accommodate any topography of circuit elements required on the side of the quartz substrate 402 that the handle 404 will cover. The handle substrate 404 serves as a temporary handle for thinning the quartz substrate 402.

Figure 4A:
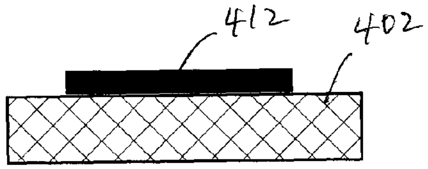
Figure 4B:
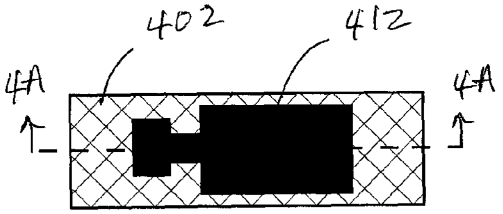

FIGS. 4A and 4B are, respectively, a cross sectional view and a top view of a step in the fabrication of a planar RF electromechanical switch of the present disclosure. These figures illustrate a quartz substrate 402 in which a top actuation electrode 412 has been patterned and metallized to the quartz substrate 402. In one embodiment of the present disclosure, 200 Angstrom Ti/1000 Angstrom gold may be patterned and metallized to form a top actuation electrode 412 on the top side of the quartz substrate 402.

Figure 5A:
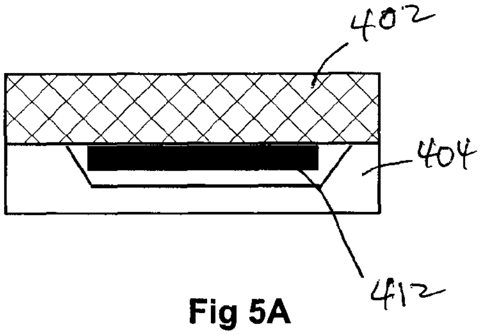
Figure 5B:
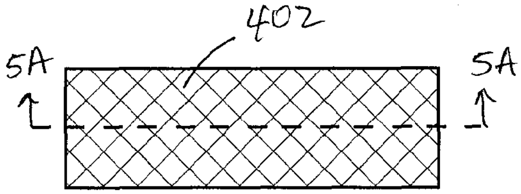

FIGS. 5A and 5B are, respectively, a cross sectional view and a top view of a step in the fabrication of a planar RF electromechanical switch of the present disclosure. These figures illustrate a quartz substrate 402 bonded, for example by wafer bonding, to the handle substrate 404. In FIG. 5B, the handle substrate 404 may be present though its view is blocked by the quartz substrate 402 that is above the handle substrate 404. Further illustrated is a top actuation electrode 412 that has been patterned and metallized to the quartz substrate 402. In one embodiment of the present disclosure, the quartz substrate 402 may be bonded to the handle substrate 404 for ease of thinning the quartz substrate 402. In an exemplary embodiment of the present disclosure, a handle substrate 404 may be used to temporarily handle the quartz substrate 402, wherein the handle substrate 404 has a coefficient of thermal expansion which may be approximately equivalent to the coefficient of thermal expansion of the quartz substrate 402. The top actuation electrode 412 can fit within the cavity 444 of the handle substrate 404.

Figure 6A:
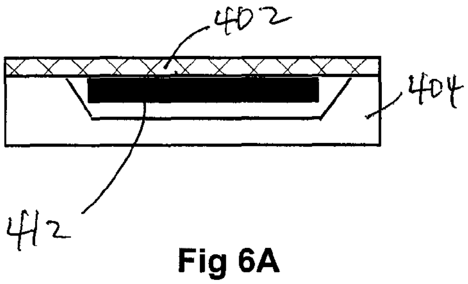
Figure 6B:
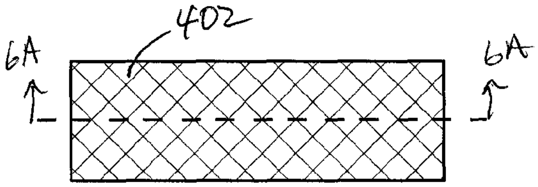

FIGS. 6A and 6B are, respectively, a cross sectional view and a top view of a step in the fabrication of a planar RF electromechanical switch of the present disclosure. These figures illustrate a thinned down quartz substrate 402 that may be bonded, for example by wafer bonding, to a handle substrate 404. In FIG. 6B, the handle substrate 404 may be present though its view may be blocked by the quartz substrate 402 that may be above the handle substrate 404. Further illustrated are a top actuation electrode 412 that has been patterned and metallized to the quartz substrate 402. In one embodiment of the disclosure, the quartz substrate 402 may be thinned to approximately 10 micrometers using conventional lapping and polishing techniques. In one exemplary embodiment of the disclosure, the quartz substrate 402 may be further reduced to less than 10 micrometers using a SF6-based plasma etch in an inductively-coupled, high-density plasma etcher.

Figure 7A:
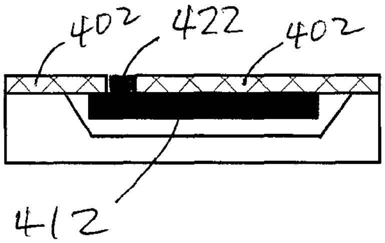
Figure 7B:
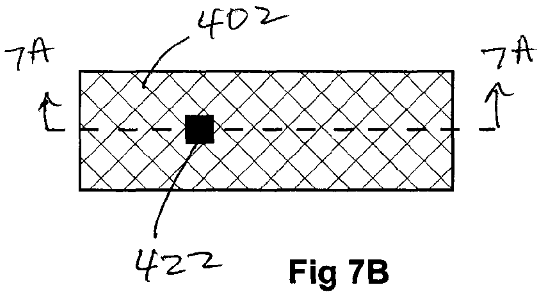

FIGS. 7A and 7B are, respectively, cross sectional views and top views of a step in the fabrication of a planar RF electromechanical switch of the present disclosure. These figures illustrate a thinned down quartz substrate 402 that may be bonded, for example by wafer bonding, to a handle substrate 404. In FIG. 7B, the handle substrate 404 may be present though its view may be blocked by the quartz substrate 402 that may be above the handle substrate 404. Further illustrated are a top actuation electrode 412 that has been patterned and metallized to the quartz substrate 402 with a via 422 etched and metallized in the quartz substrate 402. In one embodiment of the disclosure, a deep reactive ion etching (DRIE) process with CF4 chemistry and bottom-side metallization using 200 Angstrom Ti/1000 Angstrom gold may be used to create a via 422 in the quartz substrate 402.

Figure 8A:
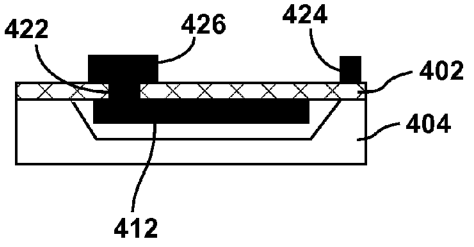
Figure 8B:
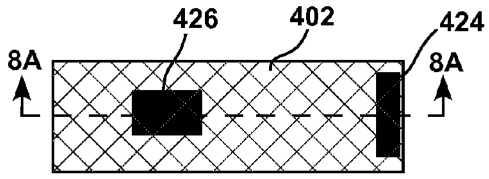

FIGS. 8A and 8B are, respectively, cross sectional views and top views of a step in the fabrication of a planar RF electromechanical switch of the present disclosure. These figures illustrate a thinned down quartz substrate 402 that may be bonded, for example by wafer bonding, to a handle substrate 404. In FIG. 8B, the handle substrate 404 may be present though its view may be blocked by the quartz substrate 402 that may be above the handle substrate 404. Also illustrated are an RF contact 424 and a bottom bond pad 426, in which the RF contact 424 and the bottom bond pad 426 have been patterned and metallized on the quartz substrate 402. In one exemplary embodiment of the disclosure, metal interconnect may be used to electrically connect the top actuation electrode 412 through the via 422 to the top bond pad 426.

Figure 9A:
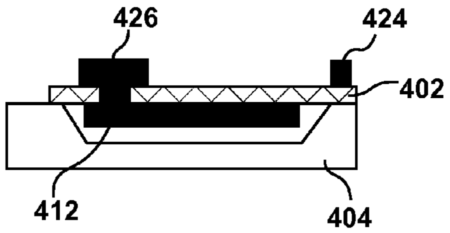
Figure 9B:
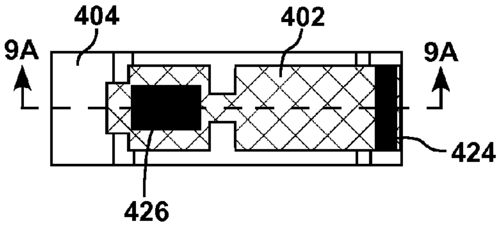

FIGS. 9A and 9B are, respectively, cross sectional views and top views of a step in the fabrication of a planar RF electromechanical switch of the present disclosure. These figures illustrate a thinned down quartz substrate that has been patterned and etched down to form a switch beam quartz substrate 402 that may be bonded, for example by wafer bonding, to a handle substrate 404. In one embodiment of the disclosure, the quartz substrate 402 may be patterned and etched down using a second DRIE step to delineate a switch cantilever pattern, an example of which is shown in FIG. 9B.

Figure 10A:
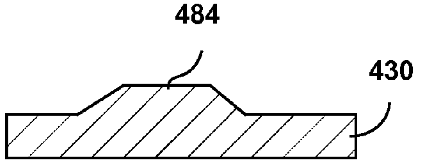
Figure 10B:
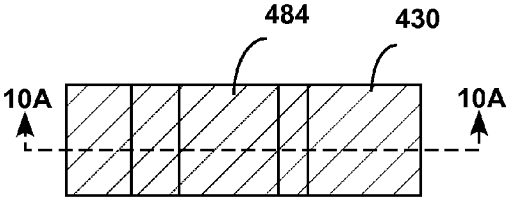

FIGS. 10A and 10B are, respectively, cross sectional views and top views of a step in the fabrication of a planar RF electromechanical switch of the present disclosure. These figures illustrate a host substrate 430 that has an etched protrusion 484. In one embodiment of the disclosure, the host substrate 430 may be patterned and etched to create a protrusion 484 that protrudes about 5 micrometers high from the host substrate 430.

Figure 11A:
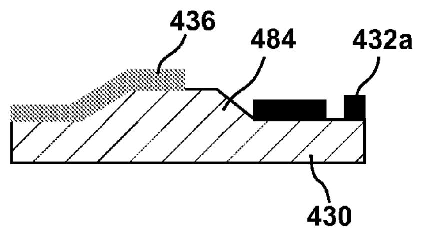
Figure 11B:
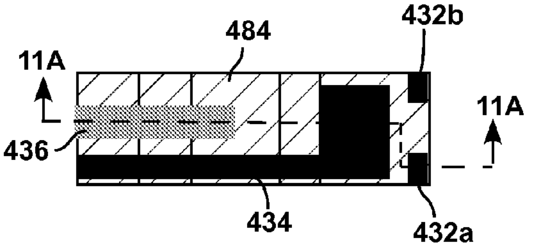

FIGS. 11A and 11B are, respectively, cross sectional views and top views of a step in the fabrication of a planar RF electromechanical switch of the present disclosure. The RF line 432-*a*, 432-*b*, bottom actuation electrode 434 and bottom bond pad 436 are patterned and metallized on the host substrate 430 with the bottom bond pad 436 terminating at the top of the etched protrusion 484. In one embodiment of the disclosure, metal (200 Angstrom Ti/5000 Angstrom Au) may be deposited on the protrusion 484 to form bottom bond pads 436.

Figure 12A:
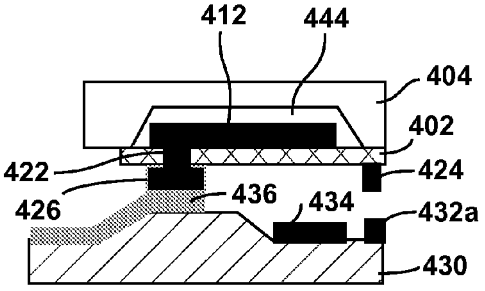
Figure 12B:
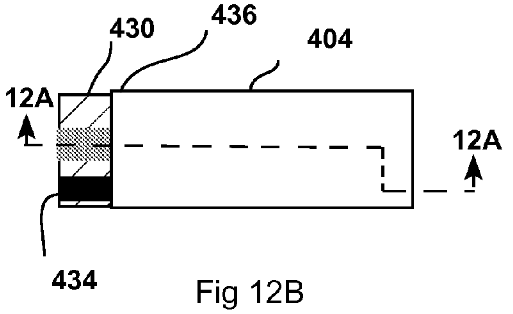

FIGS. 12A and 12B are, respectively, cross sectional views and top views of a step in the fabrication of a planar RF electromechanical switch of the present disclosure. These figures illustrate a thinned down quartz substrate 402 (not visible in FIG. 12B) that may be bonded, for example, by wafer bonding, to a handle substrate 404 that has a cavity 444 containing a top actuation electrode 412. In FIG. 12B, the quartz substrate 402 and the via 422 are present though their view are blocked by the handle substrate 404 that may be above these elements. Also illustrated are an RF contact 424 and a top bond pad 426 (not visible in FIG. 12B), in which the RF contact 424 and the top bond pad 426 have been patterned and metallized on the quartz substrate 402. Also illustrated are a RF line 432, a bottom actuation electrode 434 and a bottom bond pad 436. The RF line 432-*a*, 432-*b*, bottom actuation electrode 434 and bottom bond pad 436 have been patterned and metallized on the host substrate 430. Further illustrated may be the top bond pad 426 that may be bonded to the bottom bond pad 436. Also illustrated are a RF line 432, a bottom actuation electrode 434 and a bottom bond pad 436. The RF line 432, bottom actuation electrode 434 and bottom bond pad 436 are patterned and metallized on the host substrate 430. In an exemplary embodiment of the disclosure, the top bond pad 426 may be bonded to the bottom bond pad 436 by thermal compression bonding. In one embodiment of the disclosure, the top bond pad 426 may be bonded to the bottom bond pad 436 by wafer bonding. In one embodiment of the disclosure, the top bond pad 426 may be bonded to the bottom bond pad 436 by aligning the host substrate 430 with the handle substrate 404 using a bond aligner and then bonding the top bond pad 426 to the bottom bond pad 436 using a wafer bonder having compression pressure of approximately 10 Mpa. In one embodiment of the present disclosure, the handle substrate 404 may be aligned to distribute approximately uniformly its stress load across the host substrate 430.

Figure 13A:
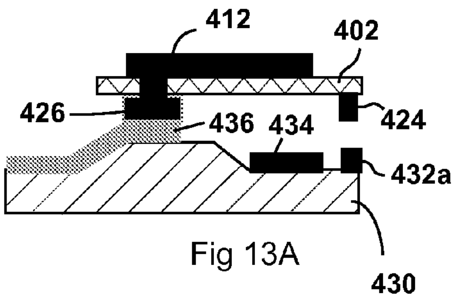
Figure 13B:
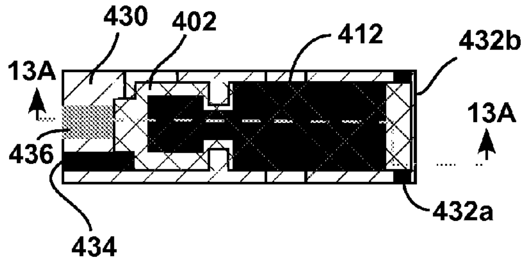

FIGS. 13A and 13B are, respectively, cross sectional views and top views of a step in the fabrication of a planar RF electromechanical switch of the present disclosure. These figures illustrate that the handle substrate (illustrated as 404 in FIGS. 12A and 12B) has been removed from the thinned down quartz substrate 402. Also illustrated are an RF contact 424 and a top bond pad 426 (not visible in FIG. 13B), in which the RF contact 424 and the top bond pad 426 have been patterned and metallized on the quartz substrate 402. Also illustrated are a RF line 432, a bottom actuation electrode 434 and a bottom bond pad 436. The RF line 432, bottom actuation electrode 434 and bottom bond pad 436 have been patterned and metalized on the host substrate 430. Further illustrated may be the top bond pad 426 that may be bonded to the bottom bond pad 436. In one embodiment of the present disclosure, the handle substrate (illustrated as 404 in FIGS. 12A and 12B) may be removed from the quartz substrate 402. A dry etching, such as SF6 plasma etch, may be used for the removal. A wet etching may also be used, in which critical point drying occurs to remove liquid after carrying out the wet silicon etching. Also, a deep reactive ion etching may be used to remove the handle substrate 404.

Figure 14:
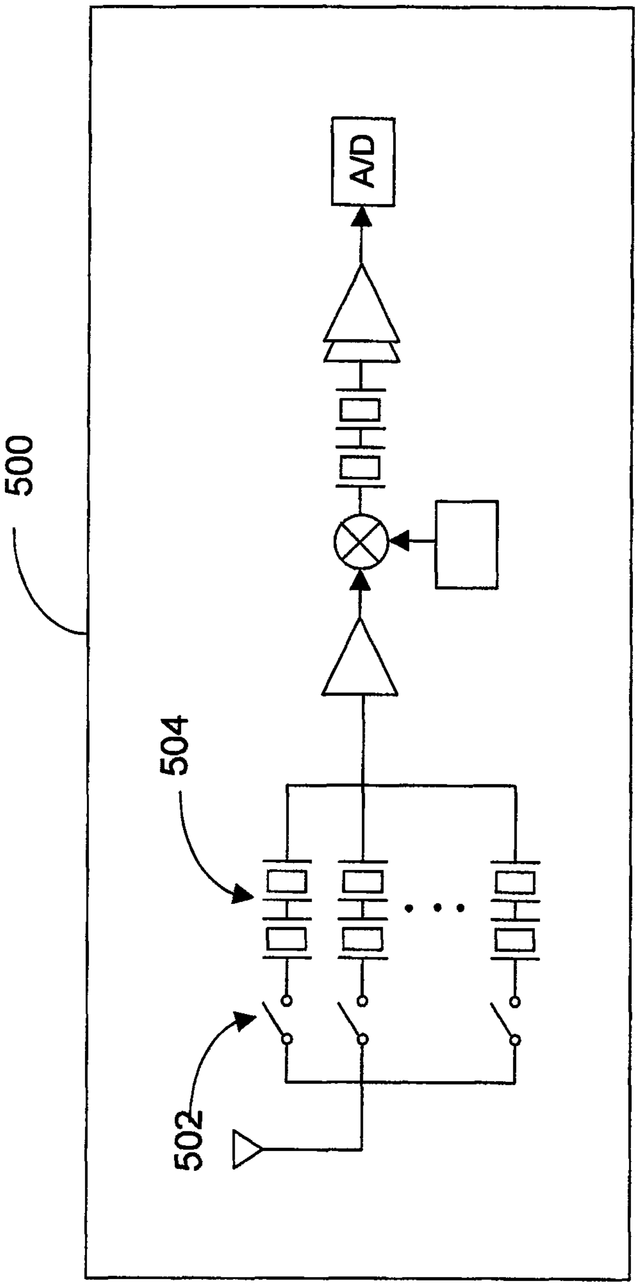
FIG. 14 is a diagram depicting a planar RF electromechanical switch of the present invention that comprises a host substrate that is connected to multiple electronic apparatuses in accordance with the present invention.

FIG. 14 is a diagram depicting a planar RF electromechanical switch that comprises a host substrate 500 that is connected to electronic apparatuses, on-chip filters 504 and switches 502, according to the present invention, that together form a quartz channel selector. The host substrate 500 can be a group III substrate, a group IV substrate, or a group V substrate. In a preferred embodiment the host substrate is silicon. In an embodiment of the present invention, the host substrate 500 is the substrate itself to which the cantilever arm of the switch of the present invention is bonded.

Figure 15A:
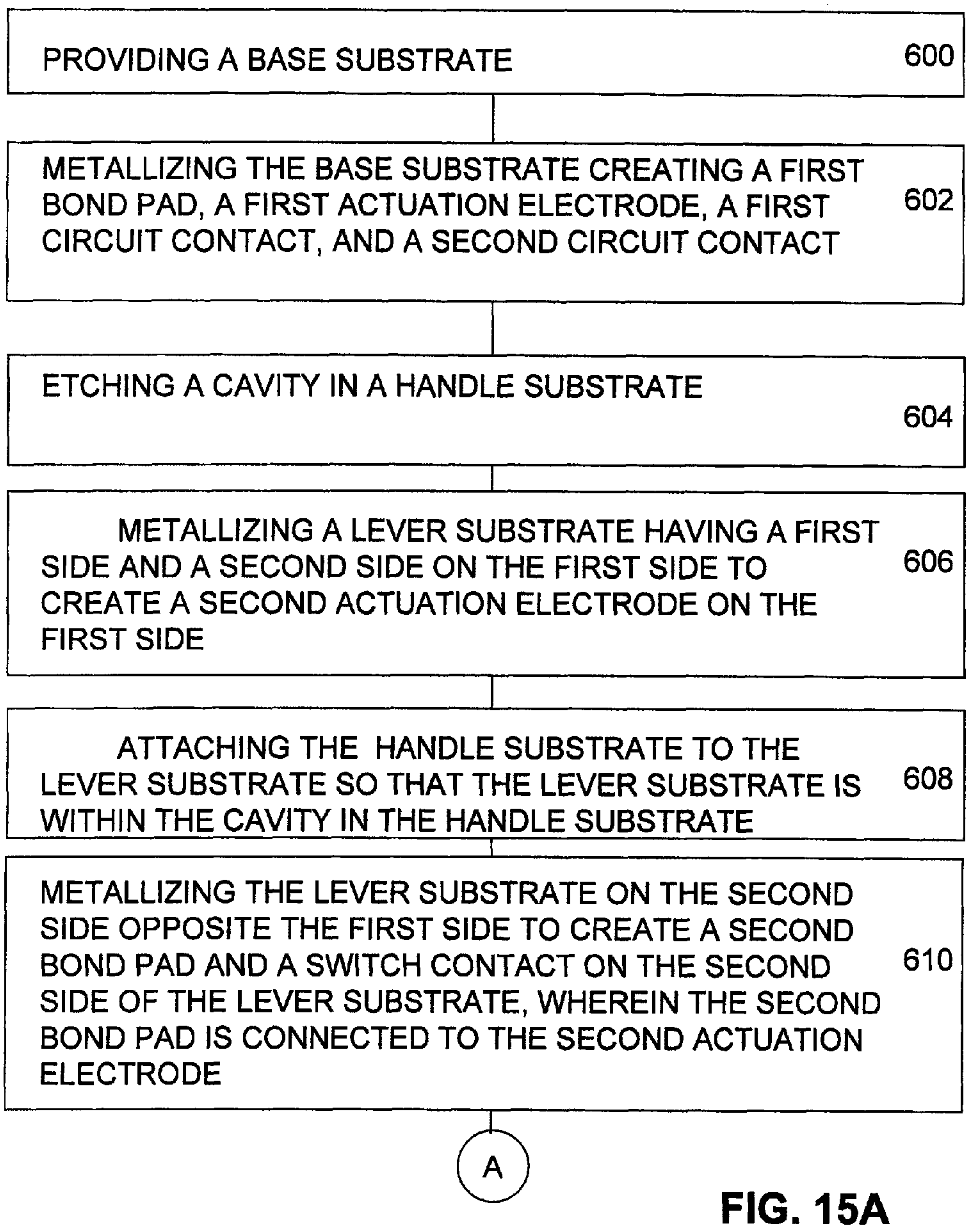
FIGS. 15A and 15B are flow charts of a method for fabricating a planar RF electromechanical switch in accordance with the present invention.
Figure 15B:
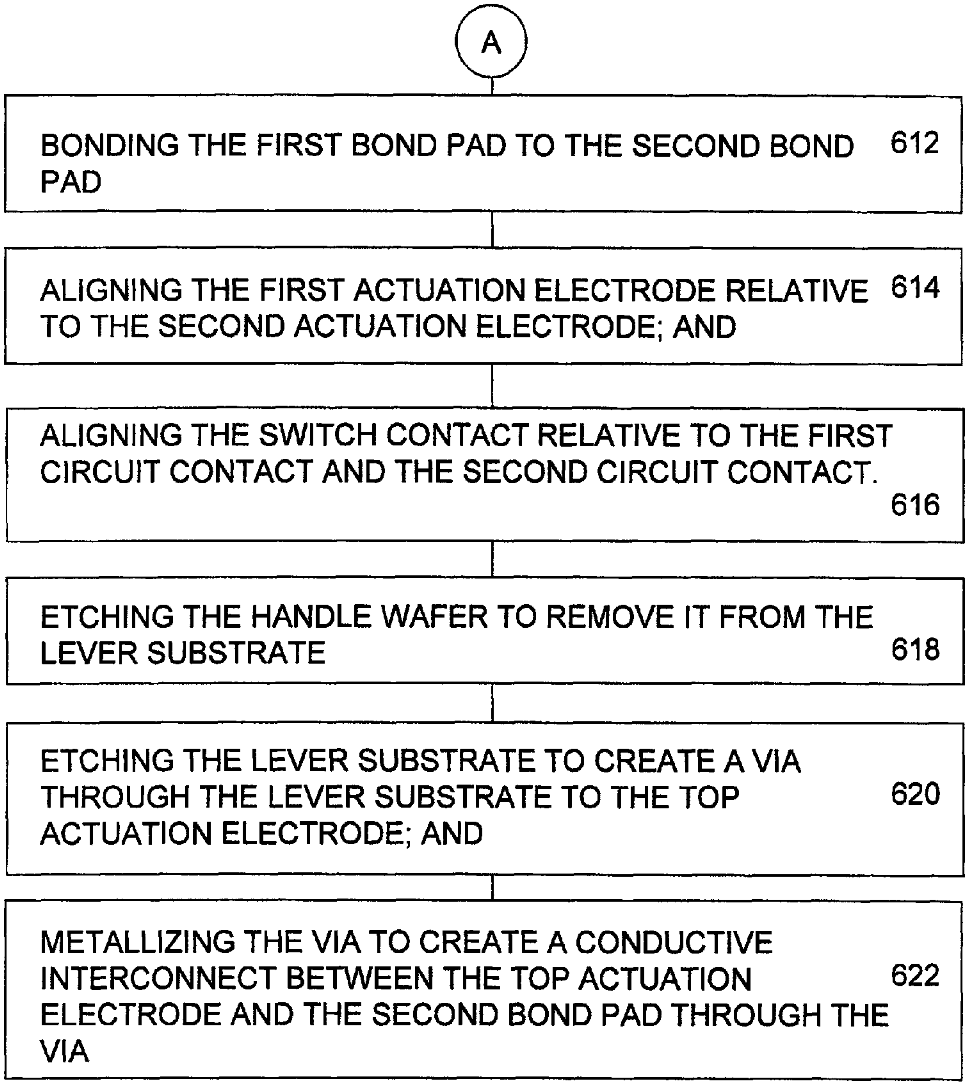

FIGS. 15A and 15B are flow charts of a method for fabricating a planar RF electromechanical switch in accordance with the present invention. In step 600 a base substrate 430 is provided. Then in step 602 the base substrate 430 is metalized creating a first bond pad 436, a first actuation electrode 434, a first circuit contact 432*a*, and second circuit contact 432*b*. Next in step 604 a cavity 444 is etched in a handle substrate 404. Then in step 606 a lever substrate 402, which may be quartz, and which has a first side and a second side, is metalized on a first side to create a second actuation electrode 412 on the first side. Then in step 608 the handle substrate 404 is attached to the lever substrate 402 so that the lever substrate

402 is within the cavity 444 in the handle substrate 404. Next in step 610 the lever substrate 402 is metalized on the second side opposite the first side to create a second bond pad 426 and a switch contact 424 on the second side of the lever substrate, wherein the second bond pad 426 is connected to the second actuation electrode 412. Then in step 612 the first bond pad 436 is bonded to the second bond pad 426. Next in step 614 the first actuation electrode 434 is aligned relative to the second actuation electrode 412. Next in step 616 the switch contact 424 is aligned relative to the first circuit contact 432*a* and the second circuit contact 432*b*. Then in step 618 the handle substrate 404 is etched to remove it from the lever substrate 402. The method may include step 620 in which the lever substrate 402 is etched to create a via 422 through the lever substrate 402 to the top actuation electrode 412. In step 622 the via 422 is metalized to create a conductive interconnect between the top actuation electrode 412 and the second bond pad 426 through the via 422.

The method according to the present disclosure for the fabrication of a planar RF electromechanical switch may be used to fabricate single-pole, single-throw (SPST) and single-pole, multi-throw (SPMT) switches.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A process of fabricating a micro electromechanical switch, the process comprising:

providing a base substrate;

metalizing the base substrate to create a first bond pad, a first actuation electrode, a first circuit contact, and a second circuit contact;

etching a cavity in a handle substrate;

metalizing a lever substrate having a first side and a second side on the first side to create a second actuation electrode on the first side;

attaching the handle substrate to the lever substrate so that the lever substrate is within the cavity in the handle substrate;

metalizing the lever substrate on the second side opposite the first side to create a second bond pad and a switch contact on the second side of the lever substrate, wherein the second bond pad is connected to the second actuation electrode;

bonding the first bond pad to the second bond pad; and etching the handle substrate to remove it from the lever substrate.

2. The process of claim 1, wherein the bonding the first bond pad to the second bond pad includes:

aligning the first actuation electrode relative to the second actuation electrode; and aligning the switch contact relative to the first circuit contact and the second circuit contact.

3. The process of claim 1, further comprising:

etching the lever substrate to create a via through the lever substrate to the top actuation electrode; and metalizing the via to create a conductive interconnect between the top actuation electrode and the second bond pad through the via.

4. The process of claim 1, wherein the bonding includes thermal compression bonding.

5. The process of claim 1, wherein the bonding includes wafer bonding.

6. The process of claim 1, wherein the handle substrate has a coefficient of thermal expansion approximately equivalent to that of the lever substrate.

7. The process of claim 1, wherein the etching the handle substrate includes a dry etching.

8. The process of claim 7, wherein the dry etching includes a SF6 plasma dry etching.

9. The process of claim 1, wherein the etching the handle substrate includes a wet etching.

10. The process of claim 9, wherein the wet etching includes a wet silicon etching and a critical point drying of the lever substrate.

11. The process of claim 1, wherein etching the handle substrate includes a deep reactive ion etching.

12. The process of claim 1, wherein the lever substrate is quartz.

13. The process of claim 12, wherein the quartz is fused quartz.

14. The process of claim 12, wherein the handle substrate is silicon.

* * * * *